United States Patent
Burdeniuc et al.

(10) Patent No.: US 7,872,055 B2
(45) Date of Patent: Jan. 18, 2011

(54) CATALYST COMPOSITION FOR WATER BLOWN, LOW DENSITY, RIGID POLYURETHANE FOAM

(75) Inventors: Juan Jesus Burdeniuc, Colmar, PA (US); Gary Dale Andrew, Walnutport, PA (US)

(73) Assignee: Air Products and Chenicals, Inc., Allentown, PA (US)

(*) Notice: Subject to any disclaimer, the term of this patent is extended or adjusted under 35 U.S.C. 154(b) by 231 days.

(21) Appl. No.: 12/332,845

(22) Filed: Dec. 11, 2008

(65) Prior Publication Data
US 2010/0152312 A1  Jun. 17, 2010

(51) Int. Cl.
C08G 18/28 (2006.01)
C08G 18/18 (2006.01)
C08G 18/38 (2006.01)
C08G 18/00 (2006.01)
C08J 9/00 (2006.01)

(52) U.S. Cl. ............ 521/128; 521/117; 521/118; 521/129; 521/170

(58) Field of Classification Search ........... 521/117, 521/118, 128, 129, 170
See application file for complete search history.

(56) References Cited

U.S. PATENT DOCUMENTS

| 5,229,430 A | * | 7/1993 | Tamano et al. | 521/129 |
| 5,374,666 A | * | 12/1994 | Tamano et al. | 521/129 |
| 5,591,781 A | * | 1/1997 | Yoshimura et al. | 521/129 |
| 6,387,972 B1 | * | 5/2002 | Ghobary et al. | 521/115 |
| 6,777,456 B2 | * | 8/2004 | Kiso et al. | 521/128 |
| 7,183,331 B2 | * | 2/2007 | Kiso et al. | 521/129 |
| 2004/0147705 A1 | | 7/2004 | Masuda et al. | |
| 2004/0162360 A1 | | 8/2004 | Kiso et al. | |
| 2007/0021517 A1 | * | 1/2007 | Kiso et al. | 521/117 |

FOREIGN PATENT DOCUMENTS

| JP | 2000-327741 A | 11/2000 |
| JP | 2007-031613 A | 8/2007 |
| JP | 2008-174689 A | 7/2008 |
| WO | 2004/009687 A1 | 1/2004 |
| WO | 2007/025888 A1 | 8/2007 |

* cited by examiner

*Primary Examiner*—Mark Eashoo
*Assistant Examiner*—Melissa Rioja
(74) *Attorney, Agent, or Firm*—Michael K. Boyer

(57) ABSTRACT

A method for preparing a water blown, low density, rigid polyurethane foam which comprises contacting at least one polyisocyanate with at least one polyol, at an Isocyanate Index of 70 to 200, in the presence of a blowing agent composition comprising at least 75 wt % water and an effective amount of a catalyst composition comprising a gelling catalyst which is bis-(N,N-dimethylaminopropyl)amine and a blowing catalyst which is N,N-dimethylaminoethyl-N'-methyl-ethanolamine, the foam having a density of 6 to 16 $Kg/m^3$.

20 Claims, No Drawings

US 7,872,055 B2

CATALYST COMPOSITION FOR WATER BLOWN, LOW DENSITY, RIGID POLYURETHANE FOAM

BACKGROUND OF THE INVENTION

Low density water blown spray rigid polyurethane foam is primarily used in commercial and residential areas where spraying polyurethane foam brings advantages such as heat and sound insulation as well as mechanical integrity. Such foams should advantageously have low amine emissions.

The conventional methods for making this type of foam with densities of approximately 8 Kg/m$^3$ use blowing amine catalysts such as bis-(dimethylaminoethyl)ether (BDMAEE) or pentamethyldiethylenetriamine (PMDETA). These amines are characterized by their high vapor pressure and strong amine odor. Thus, amine exposure can occur during system blend preparation, spraying and final use (occupancy).

Gelling catalysts are typically tertiary amines characterized in that they have higher selectivity for catalyzing the urethane reaction to the blowing or urea reaction. These catalysts are expected to perform poorly in systems containing high concentrations of water because of their inability to activate water towards isocyanate.

BRIEF SUMMARY OF THE INVENTION

The present invention provides a method for making a water blown, low density, rigid polyurethane (PUR) foam, especially rigid spray PUR foams. The method comprises contacting at least one polyisocyanate with at least one polyol, at an Isocyanate Index of 70 to 200, in the presence of a blowing agent composition comprising at least 75 wt % water and an effective amount of a catalyst composition comprising a gelling catalyst which is bis-(N,N-dimethylaminopropyl)amine and a blowing catalyst which is N,N-dimethylaminoethyl-N'-methyl-ethanolamine, the foam having a density of 6 to 16 Kg/m$^3$.

In another aspect, the present invention provides a catalyst composition for making a water blown, low density, rigid PUR foam comprising a gelling catalyst which is bis-(N,N-dimethylaminopropyl)amine and a blowing catalyst which is N,N-dimethylamino-ethyl-N'-methyl-ethanolamine, the catalyst composition comprising 50 to 95 wt % bis-(N,N-dimethylaminopropyl)amine and 5 to 50 wt % N,N-dimethylaminoethyl-N'-methyl-ethanolamine.

In yet another aspect, the present invention discloses a composition for making a water blown, low density, rigid PUR foam comprising the contact product of at least one polyol and a catalyst composition comprising a gelling catalyst which is bis-(N,N-dimethylaminopropyl)amine and a blowing catalyst which is N,N-dimethylaminoethyl-N'-methyl-ethanolamine, the catalyst composition comprising 50 to 95 wt % bis-(N,N-dimethylaminopropyl)amine and 5 to 50 wt % N,N-dimethylaminoethyl-N'-methyl-ethanolamine.

As an advantage of the invention, using the catalyst composition can provide foams with fine cell structure, good dimensional stability and thermal insulation.

DEFINITIONS

The following definitions are provided in order to aid those skilled in the art in understanding the detailed description of the present invention.
PUR—polyurethane.
Isocyanate Index—the actual amount of polyisocyanate used divided by the theoretically required stoichiometric amount of polyisocyanate required to react with all the active hydrogen in the reaction mixture, multiplied by 100. Also known as (Eq NCO/Eq of active hydrogen)×100.
pphp—parts by weight per hundred weight parts polyol.
BDMAEE—bis-(dimethylaminoethyl)ether
DMAEMEA—N,N-dimethylaminoethyl-N'-methyl-ethanolamine.
BDMAPA—bis-(N,N-dimethylaminopropyl)amine.
Choice Time—time in seconds for foam to reach 80% of maximum height.
Rise Time—time in seconds for foam to reach 98% of maximum height.

DETAILED DESCRIPTION OF THE INVENTION

The present invention provides a method for making water blown, low density, rigid polyurethane (PUR) foam. The method comprises contacting at least one polyisocyanate with at least one polyol, at an Isocyanate Index of 70 to 200, in the presence of a blowing agent composition comprising at least 75 wt % water and an effective amount of a catalyst composition comprising a gelling catalyst which is bis-(N,N-dimethylaminopropyl)amine and a blowing catalyst which is N,N-dimethylaminoethyl-N'-methyl-ethanolamine, the foam having a density of 6 to 16 Kg/m$^3$.

Also, in another aspect the present invention is directed to a catalyst composition comprising 50 to 95 wt % bis-(N,N-dimethylaminopropyl)amine and 5 to 50 wt % N,N-dimethylaminoethyl-N'-methyl-ethanolamine, or 60 to 90 wt % bis-(N,N-dimethylaminopropyl)amine and 10 to 40 wt % N,N-dimethylaminoethyl-N'-methyl-ethanolamine, or 70 to 85 wt % bis-(N,N-dimethylaminopropyl)amine and 15 to 30 wt % N,N-dimethylaminoethyl-N'-methyl-ethanolamine, or especially 85 wt % bis-(N,N-dimethylaminopropyl)amine and 15 wt % N,N-dimethylaminoethyl-N'-methyl-ethanolamine. This catalyst composition in an amount from 5 to 60 pphp can be used for producing water blown, low density, rigid PUR foams. Further, the present invention also is directed to compositions comprising the contact product of at least one polyol and such catalyst composition, as well as compositions comprising the contact product of at least one polyisocyanate, at least one polyol and such catalyst composition. These compositions can be used together with additional components to produce water blown, low density, rigid PUR foams.

As used in practice, catalyst systems for PUR foams typically include solutions in, for example, a diluent such as ethylene glycol. When a quantity by weight, or by mole, of the catalyst composition of the present invention is discussed, the quantity will exclude the effect of the diluent, unless stated otherwise. As an example, if 10 grams of a 50% solution of catalyst in ethylene glycol were used in a given application, the amount of the catalyst would equal 5 grams. Hence, 5 grams of that catalyst component would be used in calculating any weight ratios of that component in relation to, for example, the amount of polyol.

Applicants disclose several types of ranges in the present invention. These include, but are not limited to, a range of foam density; a range of Isocyanate Index; and a range of pphp for the water-containing blowing agent composition, surfactant, flame retardant, and catalyst composition comprising bis-(N,N-dimethylaminopropyl)amine and N,N-dimethylamino-ethyl-N'-methyl-ethanolamine. When Applicants disclose or claim a range of any type, Applicants' intent is to disclose or claim individually each possible number that such a range could reasonably encompass, as well as any sub-ranges and combinations of sub-ranges encompassed therein.

For example, a representative example follows for the parts by weight of the catalyst composition per hundred weight parts of the polyol in a foam formulation. The parts by weight per hundred weight parts polyol is referred to as pphp. Hence, by the disclosure that the catalyst composition is present in an amount from about 5 to about 60 pphp, for example, Applicants intend to recite that the pphp can be selected from about 5, about 6, about 7, about 8, about 9, about 10, about 11, about 12, about 13, about 14, about 15, about 16, about 17, about 18, about 19, about 20, about 30, about 40, about 50, or about 60 as well as any range between these two numbers (for example, 10 to 55), and also including any combination of ranges between these two numbers (for example 10 to 50 and 15 to 55).

Applicants reserve the right to proviso out or exclude any individual members of any such group, including any sub-ranges or combinations of sub-ranges within the group, that may be claimed according to a range or in any similar manner, if for any reason Applicants choose to claim less than the full measure of the disclosure, for example, to account for a reference that Applicants may be unaware of at the time of the filing of the application.

As is well known in the art, the reactivity of the catalyst composition can be moderated by the addition of carboxylic acids to form carboxylate salts of the catalyst composition of the present invention.

Although not a requirement of the present invention, the catalyst composition can further comprise other urethane catalysts materials or carboxylate salts thereof as is well known in the PUR art.

The term "contact product" is used herein to describe compositions wherein the components are contacted together in any order, in any manner, and for any length of time. For example, the components can be contacted by blending or mixing. Further, contacting of any component can occur in the presence or absence of any other component of the foam formulations described herein.

Polyisocyanates

Polyisocyanates that are useful in the PUR foam formation process include, but are not limited to, hexamethylene diisocyanate, isophorone diisocyanate, phenylene diisocyante, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's.

The catalyst system and the method of producing PUR foam of the present invention are useful, for example, in the formation of foam products for rigid and flame retardant applications, which usually require a high Isocyanate Index. As defined previously, Isocyanate Index, or NCO Index, is the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms.

PUR foam products which are produced with an Isocyanate Index from 70 to 200 are within the scope of this invention. In accordance with other aspects of the present invention, the Isocyanate Index is from 80 to 180, from 90 to 150, from 100 to 150, or from 110 to 140.

Polyols

Active hydrogen-containing compounds for use with the foregoing polyisocyanates in forming the polyurethane foams of this invention can be any of those organic compounds having at least two hydroxyl groups such as, for example, polyols. Polyols that are typically used in PUR foam formation processes include polyalkylene ether and polyester polyols. The polyalkylene ether polyol includes the poly (alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include adipic acid or phthalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

Blowing Agents

In the various aspects of the invention, the blowing agent composition comprises at least 75 wt % water, at least 80 wt %, at least 85 wt % water, at least 90 wt % water or at least 95 wt % water. In the desired embodiment of the various aspects of the invention, the blowing agent composition comprises about 100 wt % water.

Nevertheless, other blowing agents can be used in combination with the water in the PUR foam formation process and they include, but are not limited to, methylene chloride, acetone, chlorofluorocarbons (CFCs), hydrofluorocarbons (HFCs), hydrochlorofluorocarbons (HCFCs), and hydrocarbons. Non-limiting examples of HFCs include HFC-245fa, HFC-134a, and HFC-365. Illustrative examples of HCFCs include HCFC-141b, HCFC-22, and HCFC-123. Exemplary hydrocarbons include n-pentane, isopentane, cyclopentane, and the like, or any combination thereof.

The amount of blowing agent composition used can vary based on, for example, the intended use and application of the foam product and the desired foam stiffness and density. In the foam formulation and method for preparing a rigid PUR foam of the present invention, the water-containing blowing agent composition is present in amounts from about 10 to about 80 parts by weight per hundred weight parts polyol (pphp), from about 12 to about 60 pphp, from about 14 to about 40 pphp, or from about 16 to about 25 pphp.

Urethane Catalyst

Urethane catalysts accelerate the reaction to form polyurethanes, and can be used as a further component of the catalyst system of the present invention to produce PUR foam. Urethane catalysts suitable for use herein are those well known in the art and include, but are not limited to, metal salt catalysts, such as organotins, and amine compounds, such as triethylenediamine (TEDA), N-methylimidazole, 1,2-dimethyl-imidazole, N-methylmorpholine, N-ethylmorpholine, triethylamine, N,N'-dimethyl-piperazine, 1,3,5-tris(dimethylaminopropyl)hexahydrotriazine, 2,4,6-tris(dimethylamino-methyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylamino-cyclohexylamine, pentamethyldipropylenetriamine, triethanolamine, dimethylethanolamine, bis(dimethylaminoethyl)ether, tris(3-dimethylamino)propylamine, 1,8-diazabicyclo[5.4.0]undecene, bis(N,N-dimethylaminopropyl)-N'-methyl amine and their acid blocked derivatives, as well as any mixture thereof.

Miscellaneous Additives

Depending upon on the requirements during foam manufacturing or for the end-use application of the foam product, various additives can be employed in the PUR foam formulation to tailor specific properties. These include, but are not limited to, cell stabilizers, flame retardants, chain extenders, epoxy resins, acrylic resins, fillers, pigments, or any combination thereof. It is understood that other mixtures or materials that are known in the art can be included in the foam formulations and are within the scope of the present invention.

Polyurethane Foam Formulation and Process

The present invention provides a method for preparing a PUR foam which comprises contacting at least one polyisocyanate with at least one polyol, in the presence of water as a blowing agent and an effective amount of a catalyst composition comprising a gelling catalyst which is bis-(N,N-dimethylaminopropyl)amine and a blowing catalyst which is N,N-dimethylamino-ethyl-N'-methyl-ethanolamine. In accordance with the method of the present invention, PUR foams can be produced having a density from 6 Kg/m$^3$ to 16 Kg/m$^3$, or from 8 Kg/m$^3$ to 14 Kg/m$^3$, especially about 8 Kg/m$^3$.

The process according to the invention can easily be carried out by conventional means for making rigid spray polyurethane foams.

The PUR formulation comprising a polyol such as polyether polyol, water, cell stabilizers such as silicon surfactants, emulsifiers, flame retardants and optionally cell openers are combined with the catalyst composition according to this invention. Spray polyurethane foam is produced by contacting this mixture with polyisocyanate using a polyurethane foam spray gun that allows impingement mixing as is well known in the art.

One aspect of the present invention provides a method for preparing rigid PUR foam which comprises (a) forming a premix comprising:
  i) at least one polyol;
  ii) 10 to 80 pphp water;
  iii) 0.5 to 10 pphp silicon surfactant;
  iv) 0 to 50 pphp flame retardant;
  v) 0 to 60 pphp urethane catalyst; and
  vi) 5 to about 60 pphp of a catalyst composition comprising a gelling catalyst which is bis-(N,N-dimethylaminopropyl)amine and a blowing catalyst which is N,N-dimethylaminoethyl-N'-methyl-ethanolamine; and (b) contacting the premix with at least one polyisocyanate at an Isocyanate Index from about 70 to about 200.

EXAMPLES

The formulation of Table A was used to make the foams in the following Examples 1-3.

TABLE A

| Components | PPHP |
|---|---|
| Polyether Polyol | 100 |
| Emulsifier | 32 |
| Flame Retardant | 77 |
| Surfactant | 3.4 |
| Cell Opener | 0.15 |
| Catalyst Composition | varied |
| Water | 60 |
| NCO (MDI) INDEX | 120 |

The above components were mixed and allowed cooling to about 5° C. before mixing with the corresponding amount of polyisocyanate. Approximately 25 g of the above premix were mixed with 25 g of polyisocyanate (MDI) in a mechanical agitator in a two litter plastic container. Start time, rate of rise, foam height, speed of foam formation were measured using a sonar detector placed right above the mixing container and measured for several minutes. The tables below provide the foam kinetic data for the runs.

Example 1

Foam prepared with N,N-dimethylaminoethyl-N'-methyl ethanolamine (DMAEMEA) required 4.6 pphp (34.5 mmol) to match the rise profile of bis-(dimethyl-aminoethyl)ether (BDMAEE) (13.5 mmol) which is the current industry standard. Thus, BDMAEE is 2.5 times more efficient catalyst than DMAEMEA making its activity in high water formulation comparable to 2-[N-(dimethylaminoethoxyethyl)-N-methylamino]-ethanol (Catalyst 1). Although Catalyst 1 is commonly accepted as more efficient blowing catalyst in many conventional polyurethane formulations, when high concentrations of water are used, DMAEMEA efficiency was comparable to Catalyst 1. Unfortunately, the foam produce with DMAEMEA was characterized by a poor dimensional stability, i.e., shrinkage of the foam when cooled down to ambient or below ambient temperature; however, it was characterized by a finer cell structure than commercial standards based on BDMAEE. This property is of advantage when improvements in thermal insulation are required. Table 1 presents the foam kinetic data for the runs.

TABLE 1

| Parameter | BDMAEE | Catalyst 1 | DMAEMEA |
|---|---|---|---|
| Choice Time (s) | 15.6 | 13 | 13 |
| Rise Time (s) | 18.4 | 16 | 16 |
| Maximum Height (mm) | 274 | 267 | 298 |
| Final Height (mm) | 273 | 266 | 295 |

Example 2

In this example, Industry Standard Catalyst 2 comprising a blend of BDMAEE and dimethylaminoethoxyethanol (70/30 mixture by weight) was compared with bis-(dimethylaminopropyl)amine (BDMAPA) and DMAEMEA.

BDMAPA and DMAEMEA as well as Standard Catalyst 2 were used in equal amounts (24.2 pphp) and compared for shrinkage and dimensional stability. BDMAPA produced foam with slightly lower height that Standard Catalyst 2. On the other hand, DMAEMEA was able to produce foam with a significantly larger foam height than the control. The foam produced with BDMAPA was characterized by a finer cell structure, higher dimensional stability both at ambient and low temperatures than industry Standard Catalyst 2. This was a very surprising result since BDMAPA is an isocyanate-reactive gelling catalyst expected to be highly ineffective in this type of high water/low density foam system. In addition, industry Standard Catalyst 2 was characterized by the presence of blisters, "worm holes" and coarse cells near the surface which were absent when BDMAPA was used. A similar result was obtained with DMAEMEA which yielded foam with fine cell structure but with much poorer dimensional stability. Nevertheless, DMAEMEA was a more efficient blowing catalyst than Standard Catalyst 2 as evidenced by the larger foam height. Table 2 presents the foam kinetic data for the runs.

TABLE 2

| Parameter | Standard Catalyst 2 | BDMAPA | DMAEMEA |
|---|---|---|---|
| Choice Time (s) | 7 | 9 | 9 |
| Rise Time (s) | 8 | 10 | 10 |
| Maximum Height (mm) | 224 | 210 | 250 |
| Final Height (mm) | 220 | 205 | 246 |

Example 3

Using a combination of BDMAPA with DMAEMEA was of importance in order to achieve higher foam height without sacrificing dimensional stability which contributes to foam shrinkage. However, it was expected that if DMAEMEA was mixed with BDMAPA then the foam height would increase but the dimensional stability would be compromised. In order to find a kinetic match with industry Standard Catalyst 2, BDMAPA was combined with DMAEMEA in a 3/1 ratio (75 wt % BDMAPA and 25 wt % BDMAEE). Table 3 shows that the BDMAPA/DMAEMEA combination was, within experimental error, equivalent to the industry Standard Catalyst 2.

TABLE 3

| Parameter | Standard Catalyst 2 | BDMAPA/BDMAEE (3/1) |
|---|---|---|
| Choice Time (s) | 7 | 8 |
| Rise Time (s) | 8 | 9 |

TABLE 3-continued

| Parameter | Standard Catalyst 2 | BDMAPA/BDMAEE (3/1) |
|---|---|---|
| Maximum Height (mm) | 224 | 223 |
| Final Height (mm) | 220 | 220 |

Thus, dimensional stability was measure on material sprayed on wood surfaces and the foam shrinkage was measured once the sprayed material reached ambient temperature. The % height loss on the sprayed material was measured and the data is shown in Table 4. The individual components were also measured to compare the results. As can be seen DMAEMEA provided the largest shrinkage and the poorest dimensional stability. On the other hand, BDMAPA provided the best dimensional stability with the smallest shrinkage. It was surprising that dimensional stability was not compromised when BDMAPA was blended with DMAEMEA in a 3/1 ratio.

TABLE 4

| Catalyst Composition | Shrinkage (mm) |
|---|---|
| BDMAPA | 1.59 |
| DMAEMEA | 12.7 |
| STANDARD CATALYST 2 | 6.35 |
| BDMAPA (75%)/DMAEMEA (25%) | 1.59 |

The less effective blowing tertiary amine catalyst DMAEMEA was able to produced foam at a reasonably use levels but the final product was characterized by poor dimensional stability and excessive shrinkage when compared to a standard foam produced using BDMAEE. The situation was even more severe when dimensional stability was measured at lower temperatures. Nevertheless, DABCO-T was a surprisingly effective blowing catalyst as evidenced by the foam height obtained when compared to BDMAEE based standards in rate of rise experiments.

Gelling catalysts are normally considered ineffective in high water formulations because they are not particularly suitable for water activation and promotion of blowing reaction. Furthermore, gelling catalysts having isocyanate reactive groups are expected to be even more inefficient because they can get immobilized in the growing polymeric chain upon reaction with isocyanate. Thus, it was surprising to find that BDMAPA was able to produce foam having similar rate of rise profile as industry standard when comparable use levels and moles of amines were used. In addition, foam produced with BDMAPA was characterized by having a much finer cell structure than industry standards meaning the foam cells were smaller and more uniform with a narrower cell-size distribution. Furthermore, foam made with BDMAPA was characterized by good dimensional stability at ambient and below ambient temperatures. BDMAPA could also be used in combination with DMAEMEA to give foam with good dimensional stability, finer cell structure, more uniform surfaces and better thermal insulation than industry standards based on BDMAEE.

The invention claimed is:
1. A method for preparing a water blown, low density, rigid polyurethane foam which comprises contacting at least one polyisocyanate with at least one polyol, at an Isocyanate Index of 70 to 200, in the presence of a blowing agent composition comprising at least 75 wt % water and an effective amount of a catalyst composition comprising a gelling cata- lyst which is bis-(N,N-dimethylaminopropyl)amine and a blowing catalyst which is N,N-dimethylaminoethyl-N'-methyl-ethanolamine, the foam having a density of 6 to 16 Kg/m$^3$.

2. The method of claim 1, wherein the catalyst composition is present in an amount from 5 to 60 parts by weight per hundred weight parts polyol.

3. The method of claim 1, wherein the catalyst composition is present in an amount from 10 to 55 parts by weight per hundred weight parts of polyol.

4. The method of claim 1, wherein:
   (a) the at least one polyol, the blowing agent composition, and the catalyst composition are contacted to form a premix; and
   (b) the premix is contacted with the at least one polyisocyanate.

5. The method of claim 4, wherein step (a) further comprises at least one urethane catalyst.

6. The method of claim 1, wherein the catalyst composition comprises 50 to 95 wt % bis-(N,N-dimethylaminopropyl)amine and 5 to 50 wt % N,N-dimethylaminoethyl-N'-methyl-ethanolamine.

7. The method of claim 1, wherein the catalyst composition comprises 60 to 90 wt % bis-(N,N-dimethylaminopropyl)amine and 10 to 40 wt % N,N-dimethylaminoethyl-N'-methyl-ethanolamine.

8. The method of claim 1 wherein the foam density is 8 to 14 Kg/m$^3$.

9. The method of claim 1 wherein the foam density is about 8 Kg/m$^3$.

10. The method of claim 1 wherein the Isocyanate Index is 80 to 180.

11. The method of claim 1 wherein the blowing agent composition is present at 10 to 80 pphp.

12. The method of claim 1 wherein the blowing agent composition is present at 12 to 60 pphp.

13. The method of claim 1 wherein the blowing agent comprises at least 80 wt % water.

14. The method of claim 1 which comprises
   (a) forming a premix comprising:
      i) the at least one polyol;
      ii) 10 to 80 pphp water;
      iii) 0.5 to 10 pphp silicon surfactant;
      iv) 0 to 50 pphp flame retardant;
      v) 0 to 60 pphp urethane catalyst; and
      vi) 5 to 60 pphp of the catalyst composition; and
   (b) contacting the premix with the at least one polyisocyanate at an Isocyanate Index from about 70 to about 200.

15. A composition comprising the contact product of:
   (a) at least one polyol, and
   (b) a catalyst composition comprising 50 to 95 wt % bis-(N,N-dimethylaminopropyl)amine and 5 to 50 wt % N,N-dimethylaminoethyl-N'-methyl-ethanolamine.

16. The composition of claim 15, further comprising at least one urethane catalyst.

17. The composition of claim 15, further comprising at least one additive selected from at least one cell stabilizer, at least one flame retardant, at least one chain extender, at least one epoxy resin, at least one acrylic resin, at least one filler, at least one pigment, or any combination thereof.

18. The composition of claim 17, wherein the at least one polyol is at least one polyether polyol, at least one polyester polyol, or any combination thereof.

19. The composition of claim 18, wherein the catalyst composition comprises 60 to 90 wt % bis-(N,N-dimethylaminopropyl)amine and 10 to 40 wt % N,N-dimethylaminoethyl-N'-methyl-ethanolamine.

20. The method of claim 1, wherein the catalyst composition comprises 85 wt % bis-(N,N-dimethylaminopropyl)amine and 15 wt % N,N-dimethylaminoethyl-N'-methyl-ethanolamine.

* * * * *